United States Patent [19]

v. Habsburg-Lothringen

[11] 4,003,349
[45] Jan. 18, 1977

[54] ROTARY PISTON ENGINE

[76] Inventor: Leopold v. Habsburg-Lothringen, Gabelsbergerstr. 15, 8000 Munich 2, Germany

[22] Filed: Sept. 4, 1975

[21] Appl. No.: 610,300

[30] Foreign Application Priority Data

Sept. 18, 1974 Germany .......................... 2444482
Oct. 3, 1974 Germany .......................... 2447249

[52] U.S. Cl. .............................. 123/8.47; 74/459.5; 418/206
[51] Int. Cl.² ....................................... F02B 53/00
[58] Field of Search .......... 123/8.47; 418/206, 189, 418/78, 180; 74/423, 459.5

[56] References Cited

UNITED STATES PATENTS

| 1,704,236 | 3/1929 | Zuccarello et al. | 123/8.47 X |
| 3,323,499 | 6/1967 | Gijbeis | 123/8.47 X |

FOREIGN PATENTS OR APPLICATIONS

| 583,035 | 10/1924 | France | 123/8.47 |
| 2,057,475 | 10/1971 | Germany | 123/8.47 |

*Primary Examiner*—Carlton R. Croyle
*Assistant Examiner*—Michael Koczo, Jr.
*Attorney, Agent, or Firm*—W. G. Fasse; W. W. Roberts

[57] ABSTRACT

A rotary piston engine has a pair of lobed rotors affixed to parallel axes for rotation in respective connected cylinders defined by a housing. Pressure compensating channels are provided in the walls of the housing at the intersections of the connected cylinders, where the lobes of the rotors engage and lift-off from their respective cylinders. A fuel injection inlet is provided in the precompression region of the engine.

10 Claims, 14 Drawing Figures

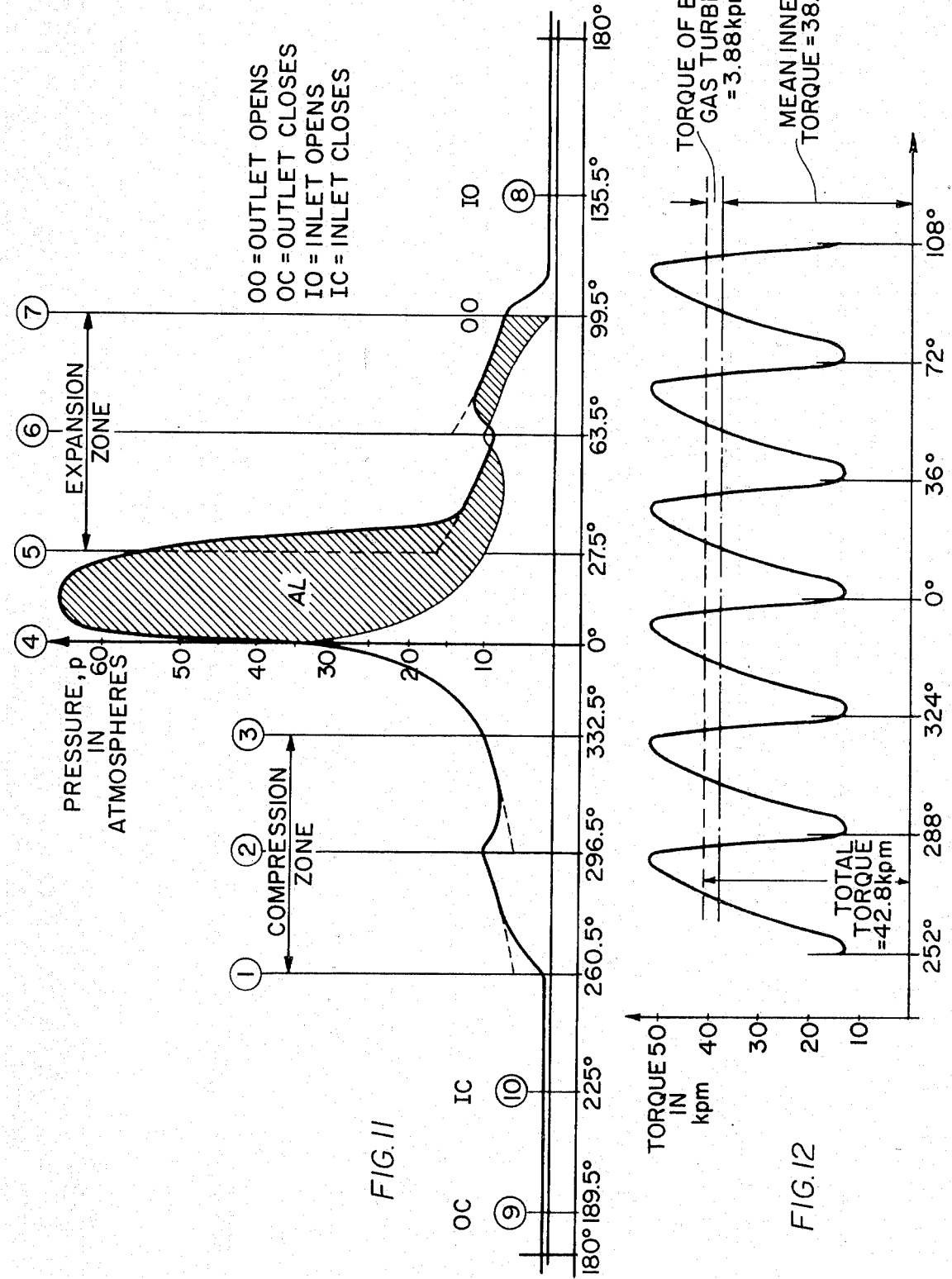

ROTARY PISTON ENGINE

BACKGROUND OF THE INVENTION

This invention relates to internal combustion engines, and is more particularly directed to an engine of the type having a pair of rotors mounted to rotate in a pair of adjacent cylinders in a housing, about parallel axles supported in the housing. Each rotor is provided with a plurality of lobes, whereby the lobes intermesh during rotation of the axles to form varying volume chambers. The lobes of the rotors have cycloidal shapes.

German Offenlegungsschrift No. 1,751,460 discloses an internal combustion engine having three working elements. Two of these elements are rotatable about parallel axes, and the other element is stationary and supports the axles of the rotors and defines a pair of cylinders. The axes of the cylinders coincide with the rotating axes of the axles of the rotors. In this arrangement all of the contours of a working chamber are defined by lines or rather surfaces along which the individual engine elements cooperate with each other. Sealing means provide a continuous seal of said surfaces. Each of these elements is maintained in direct contact with the corresponding surfaces of another element.

The manufacturing expenses of this known engine are rather high. In addition, this engine has the disadvantage that its efficiency is reduced due to the frictional forces between the cooperating elements.

German Offenlegungsschrift No. 2,123,530 discloses a rotary piston engine comprising helical gears for a compressible medium. In this arrangement the flank profile of the rib head has an epicycloidal section, which merges into an extended hypocycloid.

The generating circle of the epicycloid has a radius greater than half the height of the rib head of the meshing rotors, said radius of said generating circle, however, being smaller than half the radius of the revolving circle of the intermeshing rotors. This engine also has the disadvantage that its efficiency is substantially reduced as a result of the friction forces between the meshing gears.

Further similar arrangements are disclosed, for example, in French Pat. No. 1,520,471 and in U.S. Pat. No. 3,115,124. In the French Pat. No. 1,520,471 the engine comprises four lobed or gear rotors which rotate in the cylinders of a housing.

German Offenlegungsschrift No. 2,057,475 discloses an internal combustion engine having a pair of lobed rotors mounted in a housing for rotation in opposite directions. The rotors are rigidly secured to their respective bearing rotating shafts. Each rotor is provided with a plurality of blades or lobes having the form of cycloids. The outer extremeties of the blades or lobes run along the inner wall of the housing, and the lobes of the rotors form variable volume chambers, as a result of their rotation. These chambers are defined by the lobes of the rotors, as well as by the inner wall of the housing. The housing is also provided with an intake port for the fuel mixture, as well as with an outlet port for exhaust gases.

OBJECTS OF THE INVENTION

In view of the above, it is the aim of the invention to achieve the following objects singly or in combination:

to provide a rotary piston engine of the type having at least a pair of lobed rotors, wherein the efficiency of the engine is increased in comparison to the efficiency of the known prior art engines of this type; especially to improve and simplify the drive of the rotary piston gears;

to provide a rotary piston engine of the type having at least a pair of lobed intermeshing rotors adapted to rotate on parallel shafts, wherein an optimum pressure compensation is assured in the compression zone as well as in the expansion zone;

to provide a rotary piston engine having a pair of rotors with cycloidal intermeshing lobes rotating in a pair of cylinders, wherein the charge change losses are minimized or altogether avoided; and to avoid the use of coupling or clutch gear wheels in a rotary piston engine.

SUMMARY OF THE INVENTION

In accordance with the invention, these objects are achieved in a rotary piston engine wherein the housing is provided with pressure compensation channels in the region where the heads or tips of the lobes separate from the inner housing surface, and in which a fuel injection port is provided in the region of precompression. By these means, optimum pressure compensation in the compression and expansion zones is obtained, and losses in the charging of fuel into the device are avoided.

In a further feature in accordance with the invention, the shafts of the rotors are provided with intermeshing conical bevel gears, and all auxiliary devices involved in the operation of the motor, for example, the water pump means or cooling fan means, generator means and injection pump means and so forth are driven only by the motor drive shaft.

In this arrangement, it is not necessary to provide a coupling gear, as was required in the prior art devices. In addition, in the arrangement in accordance with the invention only about 40% of the total horsepower of the engine must be transferred to the driving shaft by way of the bevel gears for operating said auxiliary devices.

BRIEF FIGURE DESCRIPTION

In order that the invention may be clearly understood, it will now be described, by way of example, with reference to the accompanying drawings, wherein:

FIG. 11 is a chart illustrating the individual pressure and volume values of the engine to FIG. 1, for a single rotation of the rotors of the engine;

FIG. 12 illustrates the curve of the torque on the engine of FIG. 1 during a working cycle;

DETAILED DESCRIPTION OF EXAMPLE EMBODIMENTS

Figure 1:
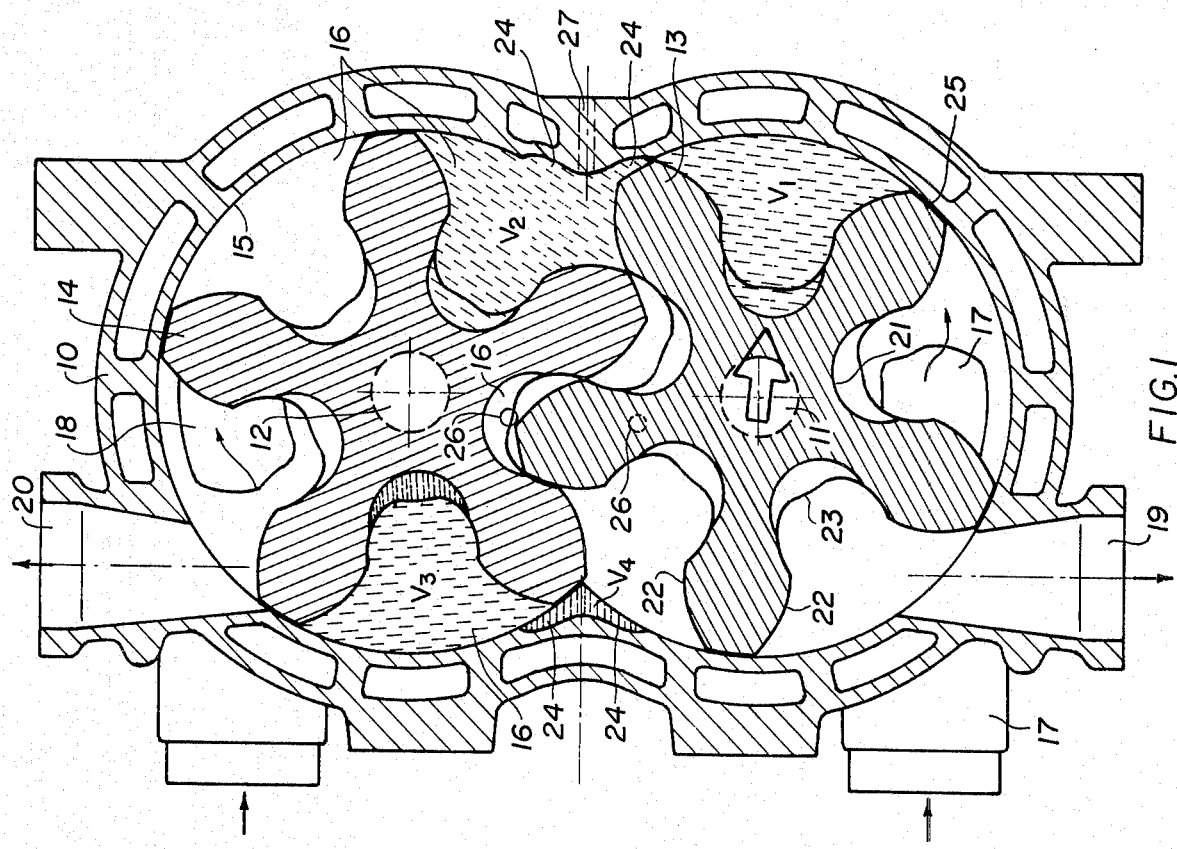
FIG. 1 is a simplified cross sectional view of a motor housing in accordance with the invention illustrating the rotors in a first working position.

FIG. 1 illustrates in simplified form a rotary piston engine in accordance with one embodiment of the invention. The engine comprises a housing 10 defining a pair of parallel cylinders defining intersecting regions. A pair of parallel shafts 11 and 12 is supported by bearings in the housing for rotation in the cylinders, and rotary pistons or rotors 13, 14 respectively are rigidly secured to the shafts 10, 11 to rotate in the cylinders. Each rotor 13, 14 has, for example, five cycloidal lobes, although a different number of lobes may be employed in accordance with the invention. The rotors 13, 14 define rotation surfaces which are spaced a minimum distance from the inner surfaces 15 of the cylinders of the housing 10. In other words, the outer diameter of the free ends of these lobes is slightly smaller than the inner diameter of the cylinders.

The lobes have cycloidal shapes and intermesh with one another during the operation of the engine. However, there is substantially no direct contact between these lobes. The lobes define variable volume chambers 16 bounded between two lobes of one rotor 13 or 14 and a lobe of the other rotor 14 or 13, as well as by the inner surfaces 15 of the cylinders in the housing 10.

The housing 10 is provided in a known manner with ports 17, 18 for the inlet of air or a fuel gas mixture, and ports 19, 20 for the exhaust of burned gases. In order to enable the frictionless or almost contactless intermeshing of the working rotors 13, 14 a pair of gears 107, 108 (FIG. 14) is arranged on the shafts outside of the housing. These gears 107, 108 provide a positive form and force locking interconnection of the two work shafts 11 and 12 or 101 and 102.

A recess 23 is provided at the base 21 of each lobe flank 22. The size of these recesses depends on the ignition system employed, as well as on the type of fuel to be used, in order to obtain the most favorable compression ratio in the engine. The recesses 23 define two positions, lying on a line between the two axes of the shafts 11, 12 at which maximum compression occurs. Depending upon the type of engine, spark plugs, glow plugs, or injection nozzles 26 are provided at the position of maximum compression. The distance between these two points depends, for example, on the lobe height of the rotors 13, 14. The recesses 23 are illustrated in more detail in FIG. 14.

Recesses 24 are arranged at the intersection region between the two cylinders in the housing 10. More specifically, these recesses 24 are located in the region where the outer ends of the lobes move away from the respective inner cylinder surface 15 during rotation. These recesses 24 begin just prior to the point where the spacing between the inner surface 15 and the outer end of a lobe starts to increase and extend somewhat beyond a point where the free end fully departs from said inner surface. These recesses act as pressure compensation channels and have volumes $V_{DA}$ milled in the housing walls. The pressure compensation is effective in the compression zone and in the expansion zone. The recesses or pressure compensation channels must be exactly designed as to size and location since they increase the volume of both zones by a determined value. Accordingly, the smallest volume of the compression chamber of the engine comprises the chamber volume proper and the volume of the compensation channel, whereby the latter comprises three volume components, namely, the volume of the channels 24 proper and the volume of the spark plugs arranged laterally in the housing, or the volume of the injection nozzles or of the glow plugs if the motor is formed as a diesel motor, as well as the compensation volume of the recessed cells at the base of the lobes. As illustrated in FIG. 1, a fuel injection port 27 extends through the housing 10, preferably along a line of intersection between the two cylinders, into the precompression region.

The operation of the rotary piston engine in accordance with the invention will be described below, with particular reference to FIGS. 1 to 10. In these figures, the rotors are illustrated in eleven sequentially occurring positions.

Referring now to FIG. 1, the volume $V_1$ corresponds to the volume defined by adjacent lobes of a rotor and the adjoining cylinder wall. In position 1, the rotors have been moved so that the volume $V_1$ of the lower rotor joins the volume $V_2$ at the upper rotor, as the volume $V_1$ moves into the precompression zone. The joining of these two volumes to a combined volume $V_3 = V_1 + V_2$ results in an adiabatic pressure equalization in the combined volume $V_3$. In the illustrated arrangement, it will be understood that the lower rotor 13 rotates in a counter-clockwise direction and the upper rotor 14 rotates in a clockwise direction. During the rotation of the rotors from position 1, as in FIG. 1, to position 2, as illustrated in FIG. 2, an adiabatic compression results, whereby the combined volume $V_3$ becomes compressed to a value $V_4$ where $V_4 = V_2 + V_5$.

Figure 2:
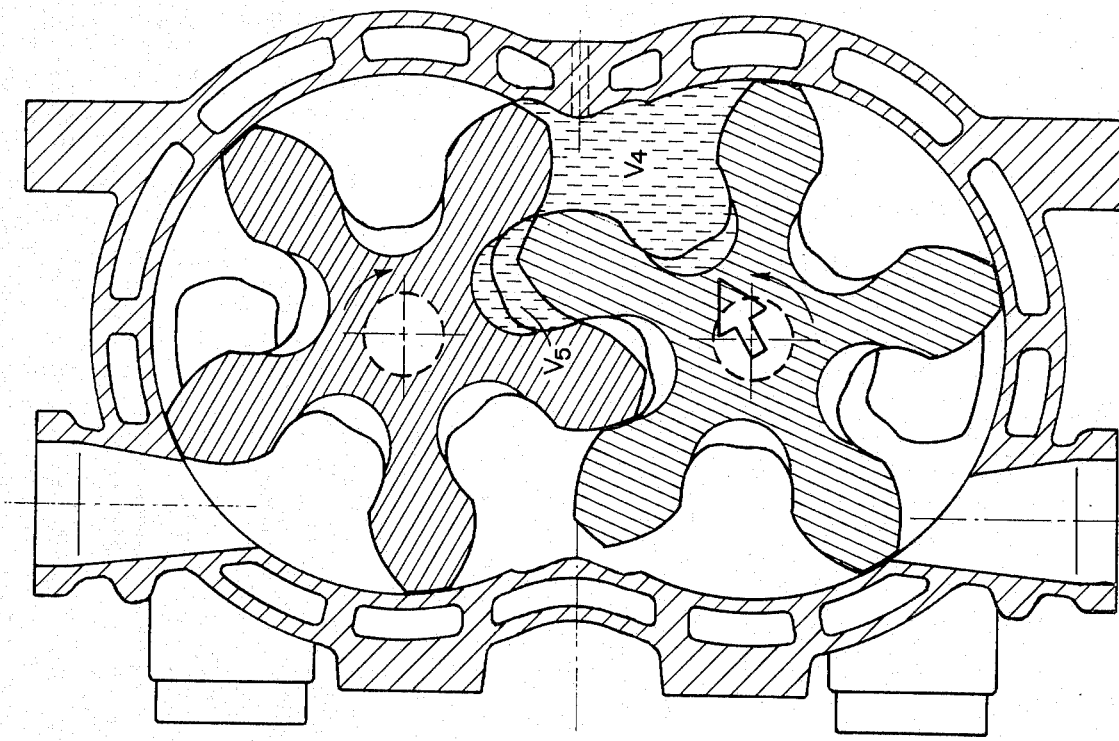
FIG. 2 is a simplified cross sectional view corresponding to FIG. 1 illustrating the rotors in a second position.
Figure 3:
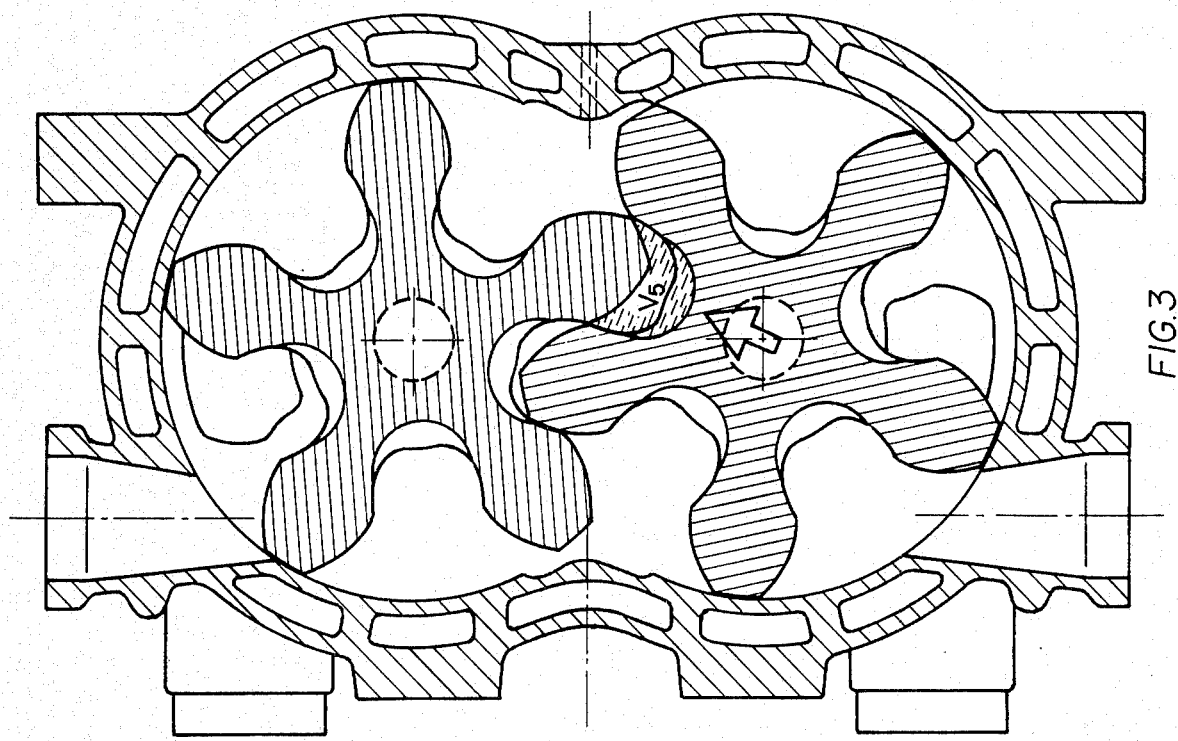
FIG. 3 is a simplified cross sectional view corresponding to FIG. 1 illustrating the rotors in a third position.
Figure 6:
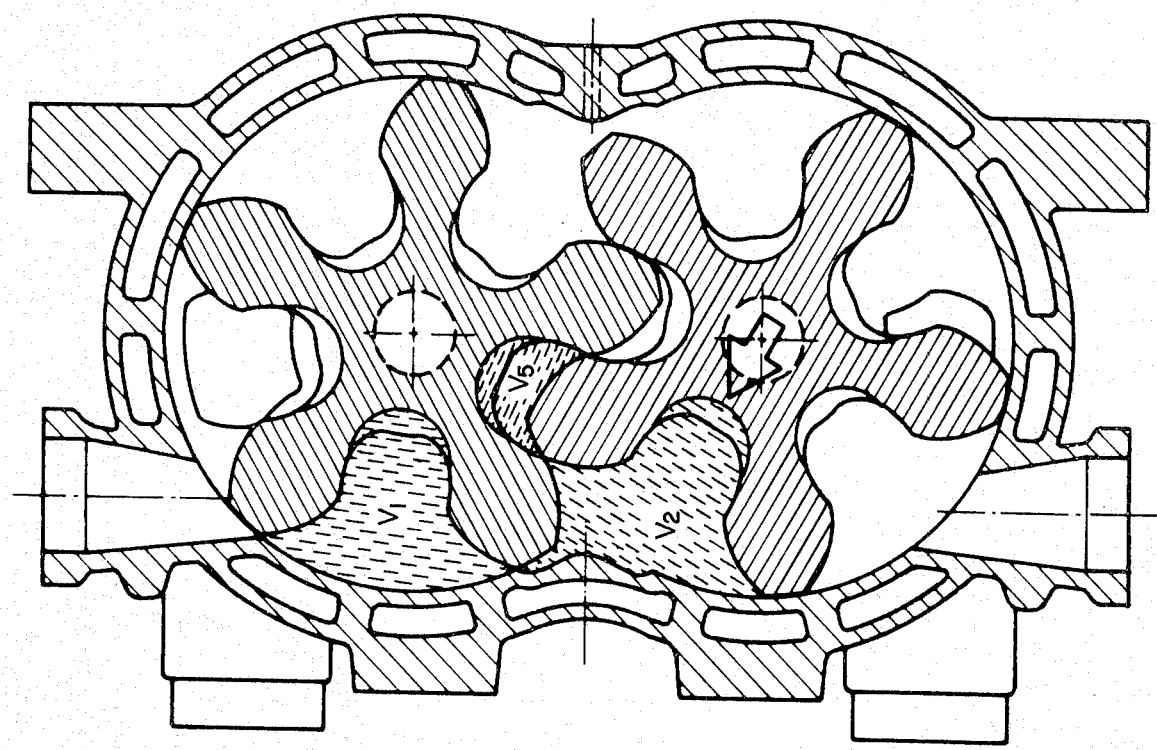
FIG. 6 is a simplified cross sectional view corresponding to FIG. 1 illustrating the rotors in a sixth position.

In position 2, as illustrated in FIG. 2, the rotors rotate to separate the volumes $V_4$ and $V_5$, the volume $V_5$ lying at the base of the lobes of the rotor 14. At the same time, a cell of the upper rotor 14 moves into the precompression zone, to combine the volume $V_4$ with the volume between the lobes of the rotor 14. As a consequence, the volume $V_4$ undergoes a pressure equalization with a resultant drop in the pressure value $p$, as illustrated in FIG. 11. The compression occurring in the rotation of the rotors from the position 2 to the position 3 is identical with that which occurs in the rotation of rotors from position 1 to position 2. As illustrated in FIG. 3, a new volume $V_5$ is separated from its volume $V_4$, between a lobe of the rotor 14 and the base of a pair of adjacent lobes of the rotor 13. In the following description it is this volume that will be discussed.

In the third position shown in FIG. 3, the cell under consideration is closed to confine the volume $V_5$. The adiabatic compression continues as the rotors move from the third position into the fourth position shown in FIG. 4 which corresponds to a dead center position. In motors having spark ignition, the ignition system is energized shortly before the rotors arrive in the dead center position illustrated in FIG. 4. Similarly, in engines having direct injection, the injection is effected shortly before the rotors reach the dead center position of FIG. 4. Thus, any ignition delay is compensated.

Figure 4:
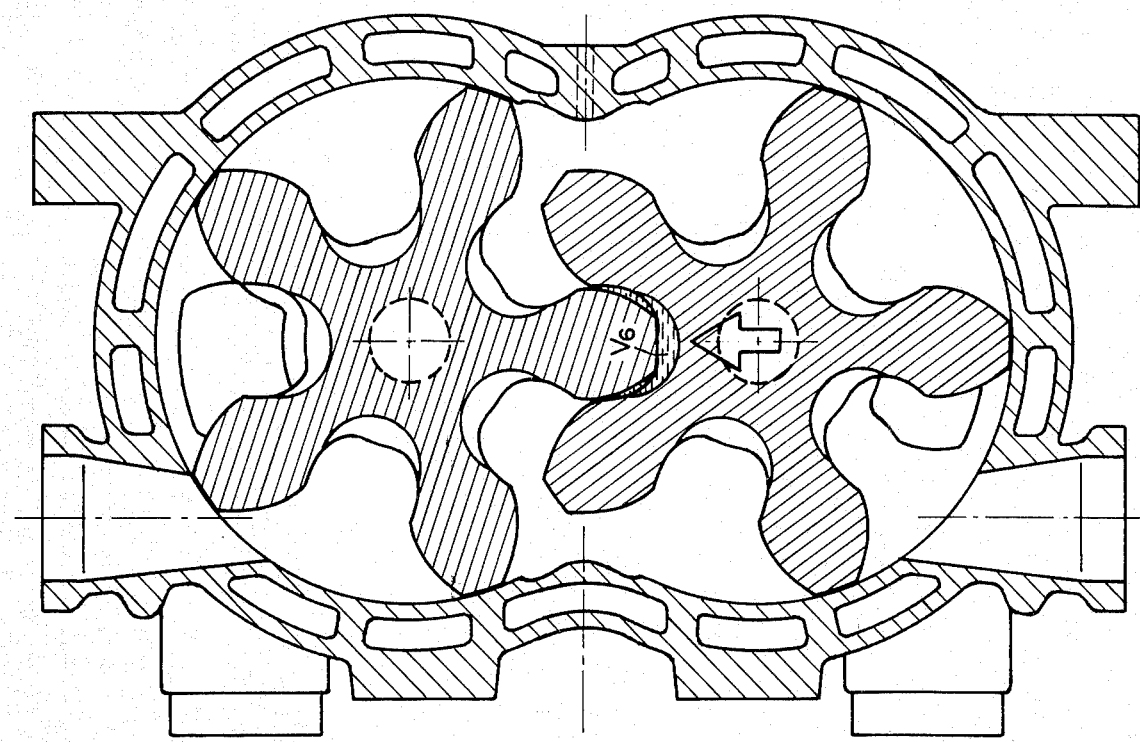
FIG. 4 is a simplified cross sectional view corresponding to FIG. 1 illustrating the rotors in a fourth position.

In the so called dead center position 4, illustrated in FIG. 4, the smallest volume $V_6$ occurs. Hence, the volume $V_6$ has the largest compression pressure, and the highest compression temperature. At this instant, the mixture in the volume $V_6$ ignites, thereby the pressure and the temperature rise to their highest values, as illustrated in FIGS. 11 and 12.

Figure 5:
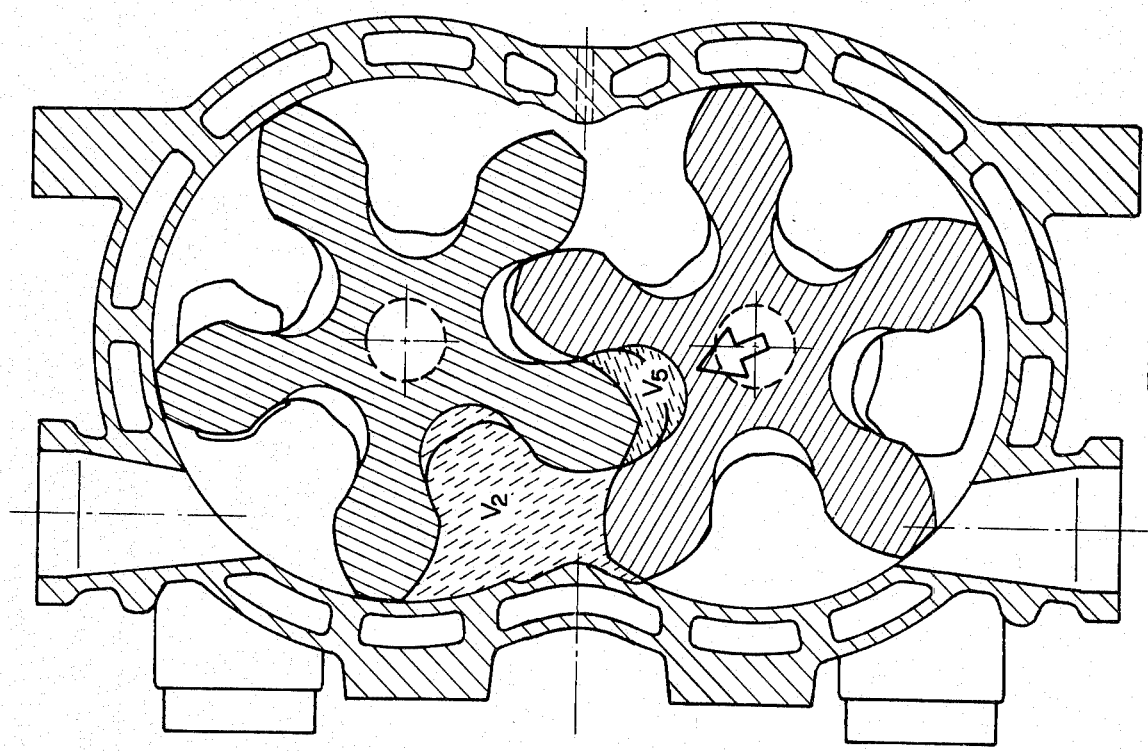
FIG. 5 is a simplified cross sectional view corresponding to FIG. 1 illustrating the rotors in a fifth position.

As the pistons rotate from position 4 to position 5, illustrated in FIG. 5, a first adiabatic expansion of the exploding gas occurs, whereby the volume $V_6$ enlarges to the volume $V_5$ and the ignition subsides again.

In position 5 the respective cell is opened for expansion, due to the separation of a lobe of the rotor 14 from a corresponding lobe of the rotor 13, whereby the rest volume $V_2$ is instantaneously obtained. This results in a pressure and temperature drop in the respective cell, which attains a new combined volume $V_4 = V_2 + V_5$ as the result of an adiabatic pressure equalization with new pressure values $p$.

From the position 5 (FIG. 5) to the position 6, (FIG. 6) a further adiabatic expansion occurs up to the end values for the pressure and for the temperature. The volume expands thereby from $V_4$ to $V_3 = V_1 + V_2$.

In position 6, the rotors 13, 14 move a cell of the opposite lying piston with the volume $V_1$ to exhaust from the expansion zone. At the same time, a cell of the opposite lying piston with an instantaneous volume $V_5$ is opened. This results in a further pressure equalization, as in the above described position 5, although this time the pressure equalization results in an energy gain inside of the expansion zone. As a result, pressure and temperature rise in the zone, as illustrated in FIG. 11.

Figure 7:
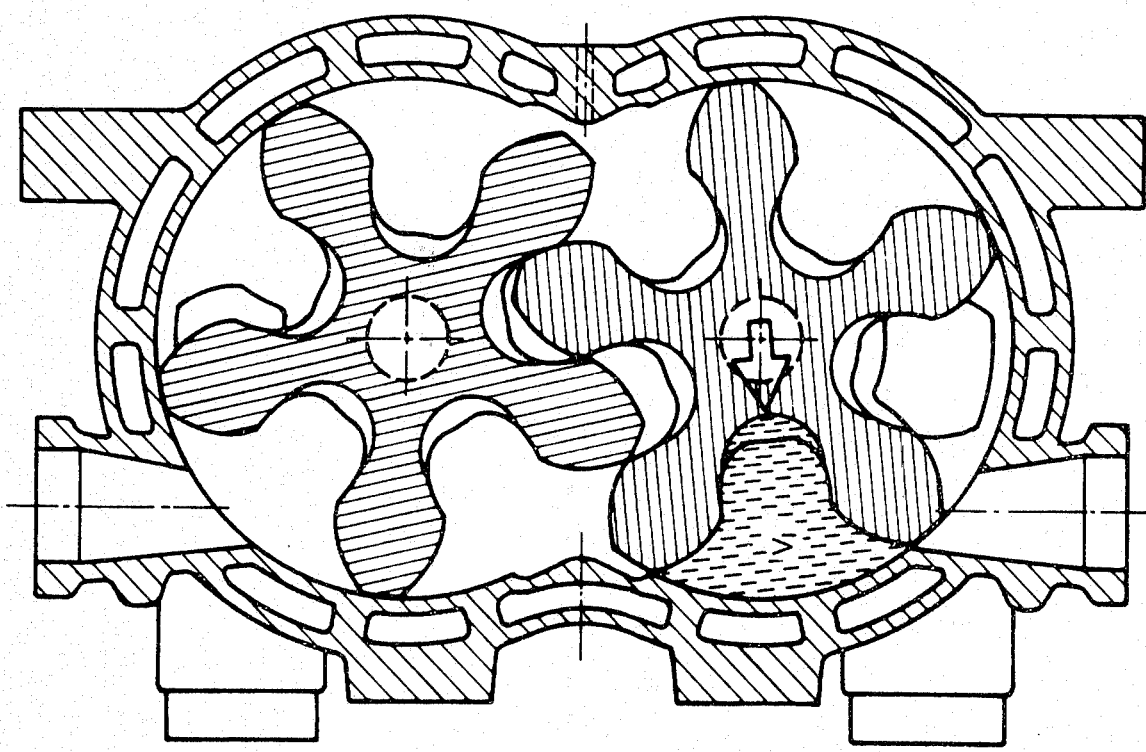
FIG. 7 is a simplified cross sectional view corresponding to FIG. 1 illustrating the rotors in a seventh position.

From position 6 to position 7, as illustrated in FIG. 7, an adiabatic expansion identical to that of the position 6 again occurs. In position 7, the rotors are rotated to such a position that the respective cell with its closed volume $V_1$ ($V_1 = V_3 - V_2$) is separated from the expansion zone whereby it is connected simultaneously to the exhaust zone.

Figure 8:
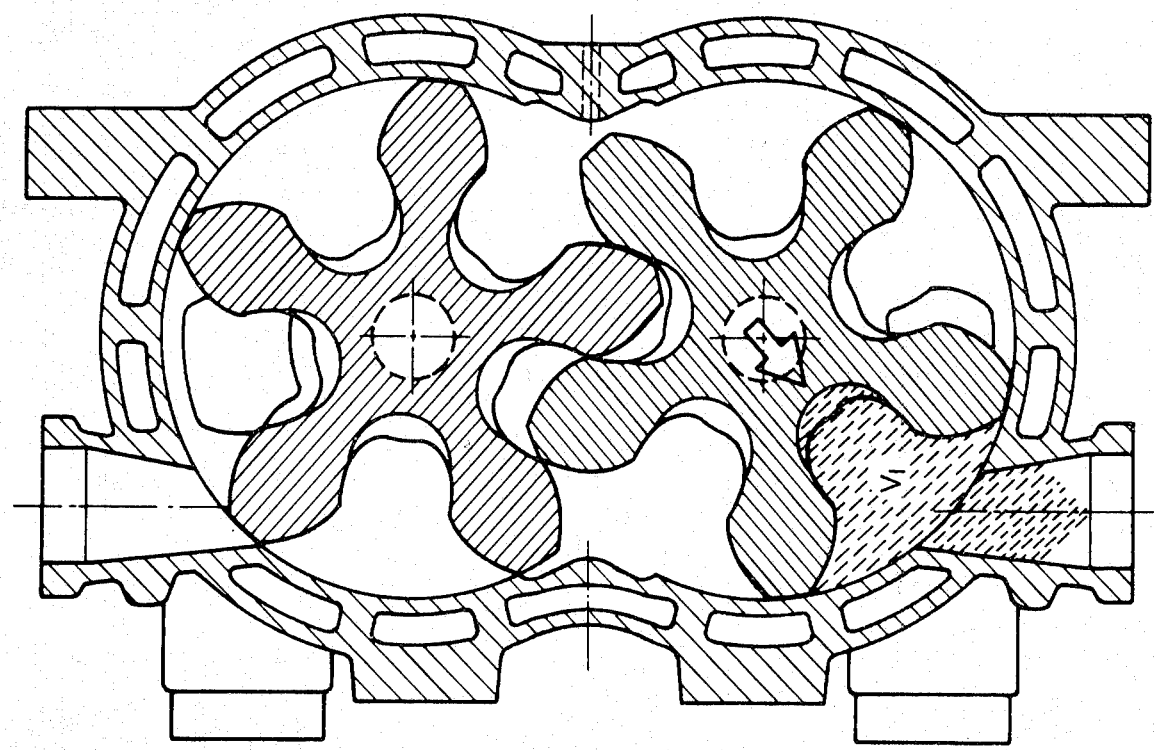
FIG. 8 is a simplified cross sectional view corresponding to FIG. 1 illustrating the rotors in an eighth position.

From position 7 to position 8, as illustrated in FIG. 8, the greater proportion of the exploded gases escape through the exhaust port 19. It will be apparent that in alternate cycles of the engine the gas is exhausted by way of the exhaust port 20. In position 8, the inlet port 17 is opened by the movement of the lobe surface, and as a consequence fresh air or a fuel mixture is introduced into the chamber between the lobes by charging means (not shown). In alternate cycles the chambers of the upper rotor are charged by way of the inlet port 18. The fresh charge simultaneously displaces the remaining exhaust gases in the respective cell, up to the time when the rotors reach position 9, illustrated in FIG. 9.

Figure 10:
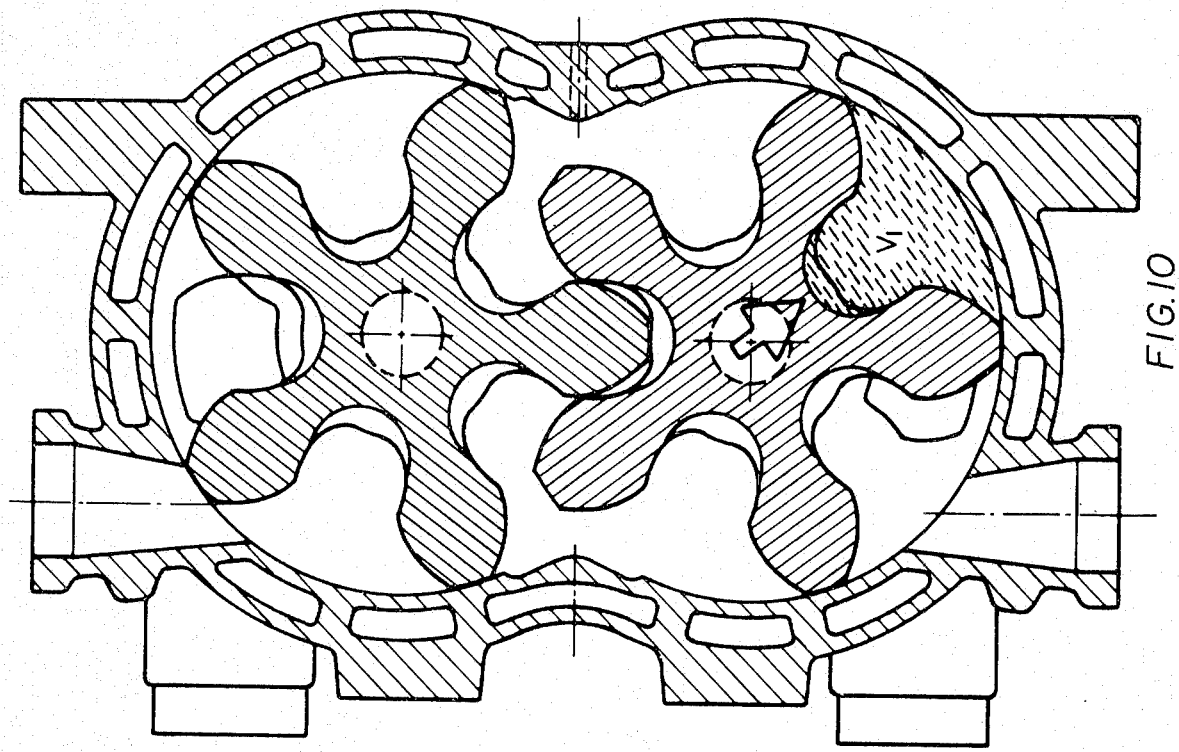
FIG. 10 is a simplified cross sectional view corresponding to FIG. 1 illustrating the rotors in a tenth position.
Figure 9:
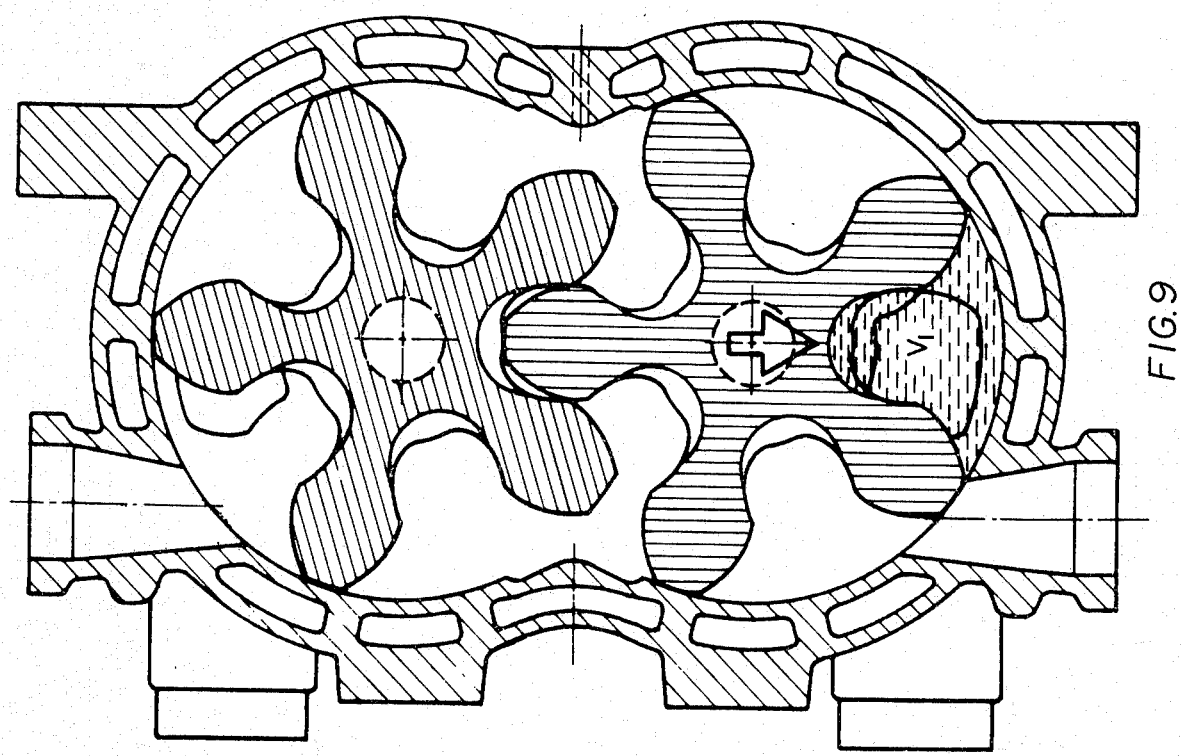
FIG. 9 is a simplified cross sectional view corresponding to FIG. 1 illustrating the rotors in a ninth position.

In FIG. 9 the exhaust port closes, and the respective cell is filled or charged completely up to the position illustrated in FIG. 10. Upon further turning of both of the rotors, the respective cell finally reaches its initial position 1, as illustrated in FIG. 1.

In the arrangement in accordance with the invention it is thereby apparent that the work phases: compression, expansion, exhaust and fresh charge are effected during a complete rotation of the two rotors 13, 14. When the engine in accordance with the invention is first turned on, it is apparent that there is only atmospheric pressure in the compression zone. In the course of about two rotations of the rotors, however, the necessary compression for operation of the engine occurs in the compression zone.

Further in the arrangement of the present invention, exhaust and fresh charge follow very rapidly due to the provision of very large sized input and exhaust ports for each cell, and there is practically no nominal value throttle loss. Consequently, the maximum number of revolutions of the rotary motor is almost exclusively dependent on the ignition time delay or the volumetric burning or exploding speeds, especially since mass acceleration forces are practically non-existent.

The thermal efficiency of the engine is decreased as a result of the two fold compression of the cell volume $V_1$ from position 1 to position 2, as well as again from position 2 to position 3, and in a much stronger measure by the pressure drop during the expansion in position 5.

The recovery of energy occurring in position 6, however compensates for this loss. The expansion of the combustion gases extends over a larger zone in the so called shaft angles, than in known prior art motors, so that the mean effective working pressure is of the same size or even greater, in spite of the lower expansion pressures in the above described rotary piston engine.

In addition to achieving an optimum efficiency, the engine in accordance with the invention provides further advantages. Thus, the temperature drop in position 3 provides the advantage that only momentary dissociation possibilities exist for the combustion gases, namely, when the rotors pass from the position 4 to 5. In the adjacent cooler expansion zone, that is in the positions 5 to 7, the carbon monoxide can after-burn with oxygen to form carbon dioxide in a more effective manner than in known engines employing the Otto cycle. In the arrangement in accordance with the invention, the thermal efficiency may be further improved by injecting fine atomized water into the expansion zone.

A further improvement of the thermal efficiency of the present engine, in comparison with prior art engines, is achieved in accordance with the invention. The inner faces of the housing come into contact only momentarily with the hot combustion gases. This is so because the inner housing surfaces are alternately cooled by the cooler face surfaces at the free ends of the lobes. In comparison with prior art internal combustion engines, the cooling required at these faces is reduced according to the invention due to the less extreme heat stress.

Figure 13:
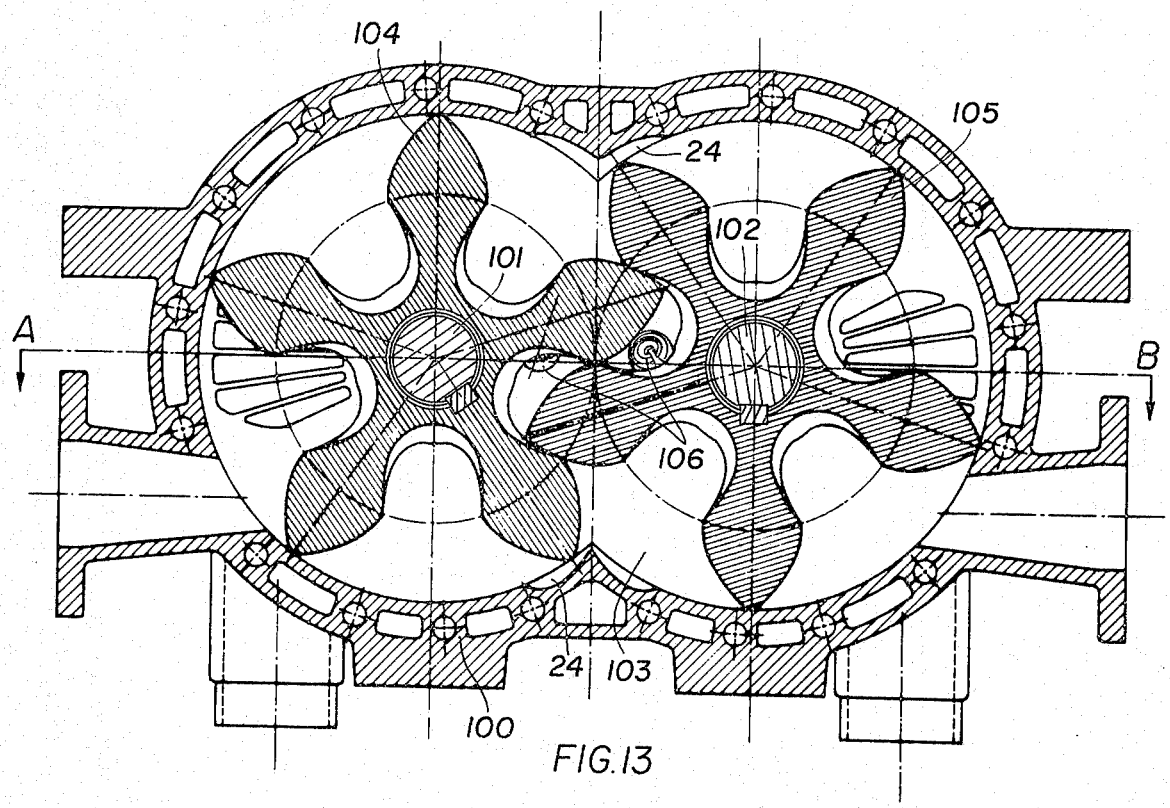
FIG. 13 is a sectional view of an engine in accordance with one embodiment of the invention, wherein the section extends vertically through the plane defined by the two shafts and also vertically through the two shafts.
Figure 14:
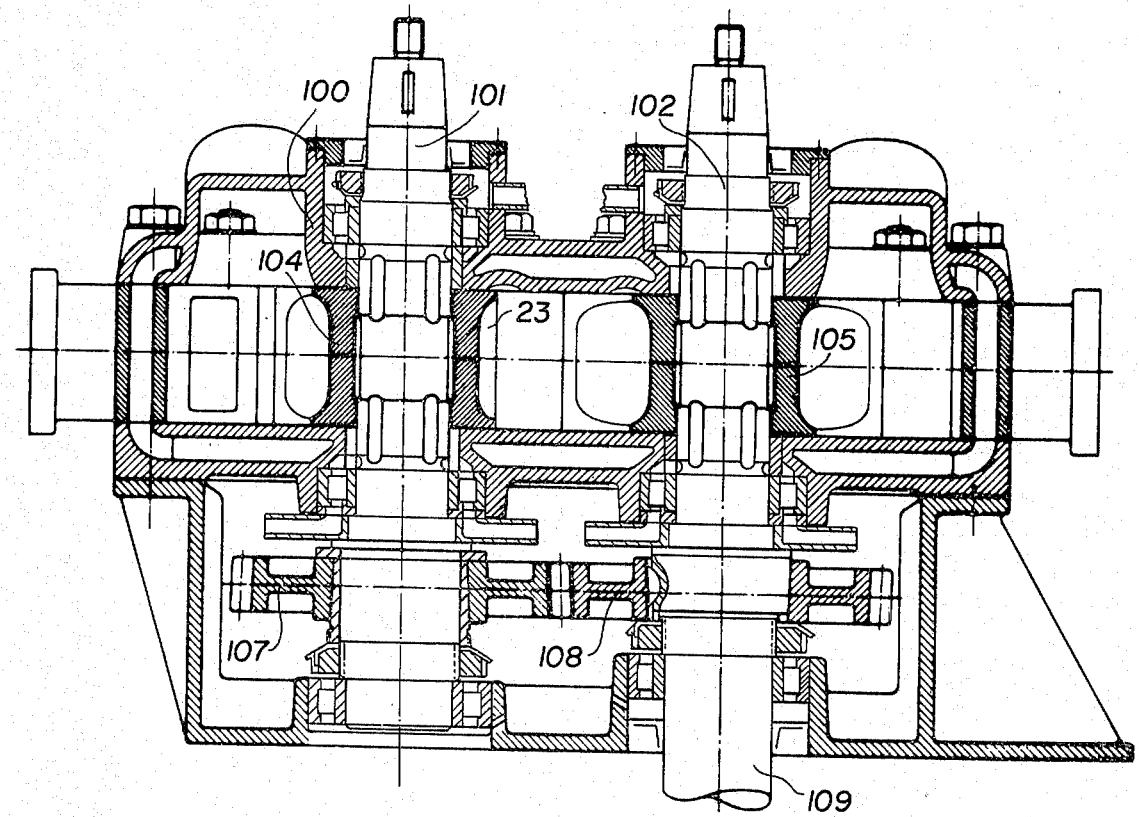
FIG. 14 is a sectional view along section line AB through the engine of FIG. 13.

FIGS. 13 and 14 illustrate further details. A housing 100 supports in respective bearings two shafts 101, 102 in parallel, spaced apart positions. The rotors 104, 105 are rigidly secured to the respective shafts. The rotors 104, 105 are provided with lobes, and recesses 24 are milled into the housing as in the embodiment of FIG. 1.

Two bevel gears 107, 108 are mounted on the ends of the shafts 101, 102 respectively. The ends of the shafts may be supported by suitable bearings in extensions of the housing as illustrated.

The bevel gears 107, 108 have straight tapered teeth, the degree of taper on the tooth faces being about 4°. These gears are conically staggered relative to each other. Stated differently, the power train or transmission does not follow an angular offset but rather extends in a plane. Thus, the gears 107, 108 intermesh with the taper of one of the gears extending in one direction, and the taper of the other gear extending in the opposite direction, with respect to the rotational axes of the gears. The intermeshing of the gears 107, 108 with each other assures the out of contact cooperation or meshing of the rotors 104, 105.

The shaft 102, which forms the drive shaft of the engine is provided with a shaft extension 109 extending through suitable bearings to the outside of the housing 100. This shaft extension 109 is provided for driving all additional apparatuses of the motor, such as a water pump, a cooling fan, a generator and an injection pump, whereby the drive shaft 102 proper of the engine extending from the other side of the engine is substantially relieved from driving auxiliary devices.

Although the invention has been described with reference to specific example embodiments, it is to be understood that it is intended to cover all modifications and equivalents within the scope of the appended claims.

What is claimed is:

1. In a rotary piston engine of the type including a housing defining a pair of parallel, intersecting cylinders and having a precompression region in the vicinity of said intersecting cylinders, and a pair of rotors affixed to parallel shafts extending coaxially in said cylinders, each rotor having a plurality of cycloidal lobes, the rotors being positioned, so that their lobes intermesh to form chambers of variable volume operating as compression and expansion zones; the improvement comprising pressure compensation recesses in the cylinder walls in the regions of the intersection of the intersecting cylinders, said pressure compensating recesses being arranged to be effective in said compression zone and in said expansion zone, and a fuel injection port in said housing in the precompression region thereof.

2. The rotary piston engine of claim 1, further comprising a bevel gear on each of said shafts externally of said housing, said bevel gears being positioned to intermesh with each other and a further shaft coupled to one of said first mentioned shafts for driving auxiliary devices of said engine.

3. The rotary piston engine of claim 2, wherein said bevel gears have oppositely directed bevels.

4. A rotary piston engine comprising a housing, a pair of parallel cylinders having inner walls and located to form intersection regions in said housing, a shaft extending coaxially in each of said cylinders, bearing means for supporting said shafts for rotation in said cylinders, a separate rotor secured to each of said shafts for rotation in its respective one of said cylinders, said rotors each having a plurality of radially extending cycloidal lobes with outer ends, said lobes intermeshing in said intersection regions of said cylinders to form expansion and compression zones with and within said housing, means external of said housing for coupling said shafts for rotation in opposite directions, and wherein said outer ends of said lobes separate from the inner cylinder walls at each intersection region in said cylinders, and pressure compensation recesses located between said cylinders at said intersection regions, said pressure compensation recesses being arranged to be effective in said compression zone and in said expansion zone.

5. The rotary piston engine of claim 4, wherein the outer ends of said lobes are slightly spaced from the inner walls of their respective cylinders to reduce friction losses.

6. The rotary piston engine of claim 5, wherein said coupling means prevent direct contacts between the lobes of said two rotors.

7. The rotary piston engine of claim 6, wherein said coupling means comprises a separate bevel gear on each of said shafts, said gears being positioned to intermesh with each other.

8. The rotary piston engine of claim 4, wherein at least one of said shafts extends through one side of said housing, and further comprising an additional shaft extending through a side of said housing different than said one side and coupled to said one shaft for rotation.

9. The rotary piston engine of claim 4, further comprising fuel injection inlets in said housing and located to reach into said intersection regions forming precompression zones.

10. The rotary piston engine of claim 1, wherein said pressure compensation recesses extend over the width of said rotors, said pressure compensation recesses beginning just prior to a point where a lobe begins to depart from said housing and ending substantially at a line of intersection of said cylinders.

* * * * *